(12) United States Patent
Adikari et al.

(10) Patent No.: US 9,742,438 B2
(45) Date of Patent: Aug. 22, 2017

(54) METHOD AND APPARATUS FOR CIPHER DETECTION (71) Applicant: Synopsys, Inc., Mountain View, CA (US)

(72) Inventors: A. A. Jithra Adikari, Ottawa (CA); Jean-Pierre Thibault, Ottawa (CA); Mike Borza, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/229,653

(22) Filed: Aug. 5, 2016

(65) Prior Publication Data

US 2016/0344409 A1    Nov. 24, 2016

Related U.S. Application Data

(63) Continuation of application No. 14/136,901, filed on Dec. 20, 2013, now Pat. No. 9,417,951.

(51) Int. Cl.
| | |
|---|---|
| G06F 11/00 | (2006.01) |
| H03M 13/00 | (2006.01) |
| H03M 13/09 | (2006.01) |
| G06F 11/10 | (2006.01) |
| H04L 9/06 | (2006.01) |

(52) U.S. Cl.
CPC ............ *H03M 13/09* (2013.01); *G06F 11/10* (2013.01); *H03M 13/611* (2013.01); *H04L 9/0618* (2013.01); *H04L 9/0631* (2013.01); *H04L 2209/34* (2013.01)

(58) Field of Classification Search
CPC .. G06F 11/10; G06F 11/0766; G06F 11/3065; H04L 9/0631; H04L 9/004; H04L 9/036; H03M 13/09; H03M 13/611
See application file for complete search history.

(56) References Cited

U.S. PATENT DOCUMENTS 7,941,725 B2 * 5/2011 Francillon ................. H04L 9/06
                                                          375/240.27
8,171,282 B2 * 5/2012 Amann ..................... H04L 9/004
                                                          380/37

OTHER PUBLICATIONS

Ilanthenral et al., Design of Hexi cipher for error correction—using Quasi cyclic partial Hexi codes, Sep. 1, 2013, NSP, Appl. Math. Inf. Sci. 7, No. 5, pp. 2061 to 2069 (retrieved from google. com Sep. 2, 2016).*

* cited by examiner

*Primary Examiner* — Shelly A Chase
(74) *Attorney, Agent, or Firm* — Jaquez Land Greenhaus LLP; Bruce W. Greenhaus, Esq.

(57) ABSTRACT

An embodiment of a method and apparatus for ciphering data. Data is provided for ciphering. The data is ciphered in a plurality of steps. For each step, determining an encoding for error detection of the data being processed within the step. Determining an output error detection encoding for the step. Processing data of the round to provide output error detection encoding. Then, verifying the encoding against a determined output error detection encoding. If the output error detection encoding is not the same as the determined error detection encoding, providing a signal indicating the presence of an error within the cipher process.

7 Claims, 11 Drawing Sheets

METHOD AND APPARATUS FOR CIPHER DETECTION

This application is a continuation of co-pending U.S. application Ser. No. 14/136,901 filed Dec. 20, 2013, entitled "Method and Apparatus for Cipher Fault Detection", the disclosure of which is incorporated herein by reference in its entirety.

The present disclosure relates to data security and more particularly to systems and methods of data obfuscation.

BRIEF SUMMARY

At least one embodiment of the disclosed method and apparatus is a method comprising: receiving data to be ciphered. Upon receiving the data, ciphering the received data within a plurality of cipher rounds. Each cipher round comprises the following steps: determining whether there is an encoding error present in the data being processed within the particular round and when the output error is detected, providing a signal indicating the presence of an error within the cipher process.

In some embodiments, the method comprises logging at least one of a presence of an error and an absence of an error during a round of the cipher process.

In some embodiments, the method comprises repeating the cipher process when an error is detected.

In some embodiments the method comprises repeating a round in which an error is detected upon detecting such an error.

In some embodiments error detection encoding comprises at least a parity symbol.

In some embodiments the at least a parity symbol comprises a multi-bit parity code.

In some embodiments the at least a parity symbol comprises a mix column parity.

In some embodiments the at least a parity symbol comprises a checksum.

In some embodiments the at least a parity symbol comprises an S-box parity.

In some embodiments the output error detection encoding is determined by determining at least a parity symbol relating to output data from processing the data for being processed within the round.

In accordance with an aspect of at least one embodiment of the disclosed method and apparatus, there is provided a method comprising: providing first data for ciphering thereof; performing a ciphering process on the first data, the ciphering process comprising a plurality of intermediate steps; calculating at least one parity symbols for at least one intermediate step; and based on the calculated at least one parity symbol, verifying a round output value of the at least one intermediate step to detect an error within the round output value.

In some embodiments the method comprises repeating at least one intermediate step until there no errors are detected within the round output value.

In some embodiments the method comprises repeating the ciphering process when an error is detected within the round output value relating to an intermediate step.

In some embodiments the method comprises repeating the ciphering process until there no errors are detected within the round output value.

In some embodiments the method comprises logging each detected error within an error log file.

In some embodiments the method comprises repeating the ciphering process when the log file is indicative of a detected error within an round output value relating to an intermediate step.

In some embodiments the method comprises calculating at least one other parity symbol for at least one other intermediate step; and based on the calculated at least one other parity symbol, verifying a second round output value of the at least one other intermediate step to detect an error within the second round output value.

In some embodiments calculating at least one parity symbol for at least one intermediate step comprises, calculating at least one parity symbol for each intermediate step within the ciphering process; and wherein verifying comprises verifying a round output value of each intermediate step to detect an error within said round output value.

In some embodiments the at least a parity symbol comprises a multi-bit parity code.

In some embodiments the multi-bit parity code supports error detection and error correction comprises automatically correcting an error in the round output value based on the multi-bit parity and the round output value.

In some embodiments the at least a parity symbol comprises a mix column parity.

In some embodiments the at least a parity symbol comprises a checksum.

In some embodiments the at least a parity symbol comprises an S-box parity.

In accordance with an aspect of at least one embodiment of the disclosed method and apparatus, there is provided a method comprising: providing external data for ciphering thereof; performing a ciphering process on the external data, the ciphering process comprising a plurality of intermediate steps comprising: providing first data for processing; calculating a result of performing an intermediate step on the first data; performing an inverse function on the result of the intermediate step; and comparing a result of the inverse function to the first data to detect an error in processing of the first data; and when the first data and the result of the inverse function are indicative of an error, performing one of logging the error and repeating calculating a result of performing the intermediate step on the first data.

In some embodiments comparing is performed by comparing at least a parity symbol derived based on the first data and at least a parity symbol based on the result of the inverse function.

In some embodiments performing a ciphering process on the external data comprises: providing second data for processing, the second data a result of the intermediate step performed on the first data: calculating a result of performing a second intermediate step on the second data; performing a second inverse function on the result of the second intermediate step; and comparing a result of the second inverse function to the second data to detect an error in processing of the second data; and when the second data and the result of the second inverse function are indicative of an error, performing one of logging the error and repeating calculating a result of performing the second intermediate step on the second data.

In accordance with an aspect of at least one embodiment of the disclosed method and apparatus, there is provided a method comprising: providing first data for ciphering thereof; performing a ciphering process on the first data, the ciphering process comprising a plurality of intermediate steps; calculating at least one error detection and correction code for at least one intermediate step; and based on the calculated at least one error detection and correction code, verifying a round output value of the at least one intermediate step to correct an error within the round output value, the error corrected solely in dependence upon the round output value and the error detection and correction code.

In some embodiments the at least one error detection and correction code comprises a multi-bit parity code.

In some embodiments the at least one error detection and correction code comprises a mix column parity.

In some embodiments the at least one error detection and correction code comprises a checksum.

In some embodiments the at least one error detection and correction code comprises an S-box parity.

In some embodiments the at least one error detection and correction code comprises one of a turbocode and a hypercode.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Cryptographic systems aim to provide strong guarantees about data security, including the confidentiality of the data and the integrity of the origin of the data. This is achieved by relying on secret data and combining the secret data with data to be protected using a strong mathematical process. Typically, the mathematical process is reversible. However, this is not always the case. One common technique for implementing a cryptographic system is referred to as a "block cipher".

When using a block cipher, data is encrypted in a sequence of sub-processes referred to as cipher rounds (hereinafter referred to merely as "rounds"). Each round is a sub-process onto itself. When using a cryptographic system employing a block cipher to encode data at a transmitting end (i.e., the end at which data is encrypted), there is a risk of data corruption. Corruption of the encrypted data makes it difficult or impossible to decode the data at a receiving end. Data corruption sometimes happens to the secret data (i.e., the key) during a round. Alternatively, the corruption happens to the data to be protected.

Figure 1A:
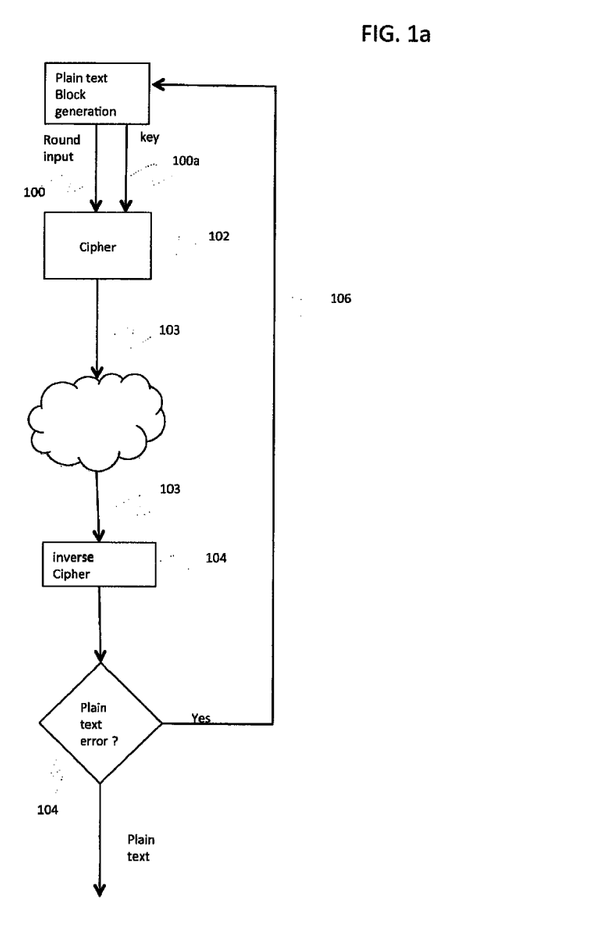
FIG. 1a is a block diagram of a redundant cipher implementation.

Referring to FIG. 1a, a round input value 100 in the form of plain text (i.e., input data for the first round) is fed into a block cipher 102 to generate ciphertext 103. The ciphertext 103 is transmitted to a receiving end to be decrypted by a reverse cipher process 104. The reverse cypher process 104 may determine that the encrypted data received at the receiving end is corrupted and cannot be converted to plain text 105 using the reverse cypher process 104. Generally, as with other communication errors, the receiving end makes a request 106 for retransmission of the block of encrypted data that was corrupted, which incurs delays, extra processing and potential additional corruption issues.

Figure 1B:
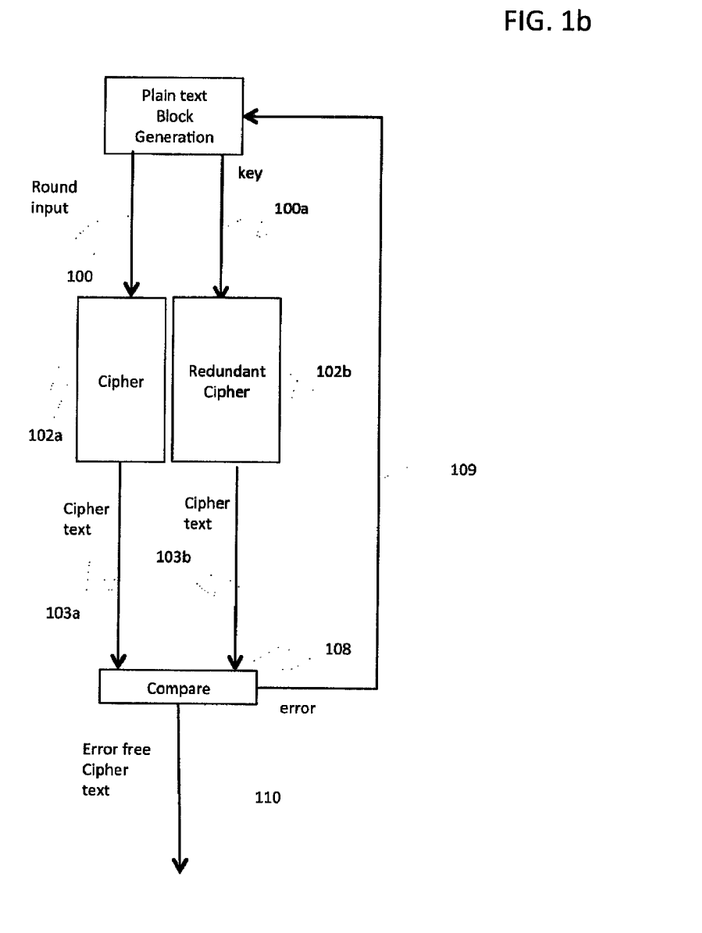
FIG. 1b is a block diagram of another redundant cipher implementation.

FIG. 1b shows a simplified block diagram of a method for addressing data corruption. The method of FIG. 1b provides the same plain text 100 to each of two duplicate cipher processes 102a and 102b at a transmitting end. This results in two cypher text versions 103a and 103b of the plain text data 100. These two results are processed at the transmitter. For example, the two results are compared by a comparator 108. When the cypher text versions 103a and 103b do not match, an error is generated at 109 and the process is re-initiated until no error is detected 110. When the round input or plain text 100 is fed to two different block ciphers 102a, 102b in parallel, encryption circuitry is significantly increased. When, instead, the results are generated in series, the encryption process is significantly slowed down. The process is repeated until no errors are detected 110, at which point the ciphertext is sent to a receiving end.

A more efficient fault detection that does not require duplicating the entire circuit would be advantageous.

Figure 2:
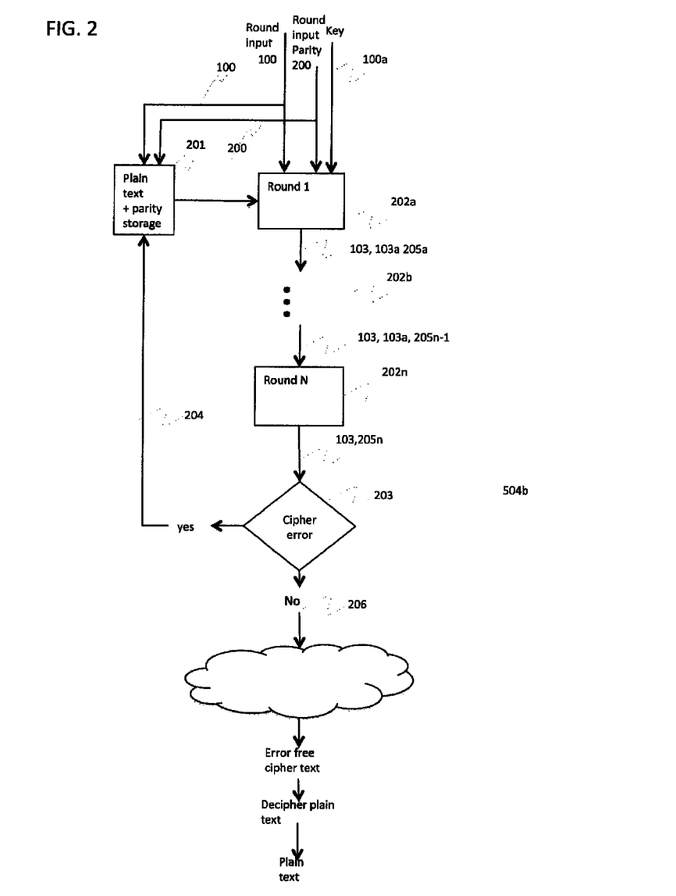
FIG. 2 is a diagram showing use of an error log to correct a cipher transmission thereof.

FIG. 2 shows a simplified block diagram of an example of a cryptographic system 2000 that does not need to have duplicate circuits for process redundancy. The system 2000 comprises a cipher processor 208, a plain text and parity storage device 201 and a cipher error block 203. In one embodiment, the cipher processor 208 performs a cipher fault detection process. In accordance with one embodiment, the system 2000 and associated cipher fault detection process support a plurality of different key sizes. In this embodiment, cipher faults (i.e., errors in processing of a cipher round and/or data corruption errors) are detected as part of the cipher process using an error detection symbol, such as parity symbols, calculated within a cipher error block 203 of the cryptographic system 2000.

Historically, parity symbols have been used to detect byte-level single bit errors and errors in an odd number of bits. However, since its first implementation, parity checking has been expanded to detect multi-bit errors. Such advanced parity checking is used in numerous coding techniques.

Optionally, multi-bit checksum or cyclic redundancy check may be used to detect errors. Data to be ciphered is received. The data, or a portion thereof, is provided as a round input value 100 to the first round. Ciphering the data comprises using a cipher process that comprises a plurality of cipher rounds. In one embodiment, each cipher round is performed by a cipher processor 208. Alternatively, each cipher round may be executed by a dedicated cipher processor or by a state machine or dedicated hardware or firmware.

The input value 100 comprises plain text for the first round 202*a*. The input value for each of the subsequent rounds 202*b* . . . 202*n* is partially ciphered text. A round output value 103 comprises partially ciphered text 205*a* . . . 205*n*-1 for all but the final round. The round output value for the final round 205*n* is ciphertext. Except for output data from the final round, round output values become round input values of a follow-on round.

Parity for the initial round input value 100*a* is fed into the first round of cipher process 104 and stored in temporary storage 201 along with the initial round input parity symbol 200. At an end of round X 202*x*, a round output value 103, a parity bit for the round output value 103*a*, and an error log 205*x* are provided to a subsequent round, typically a round that is immediately subsequent to round X. At an end of round N (i.e., the last round), the error log is checked 203 to determine whether an error occurred within the cipher process. If an error occurred during the cipher process, the cipher process is re-started 204 using the stored initial input round value 100*a*. This is repeated until the cipher process result is error free 206, in which case the ciphertext is transmitted to a decryption engine to be decrypted.

Figure 2A:
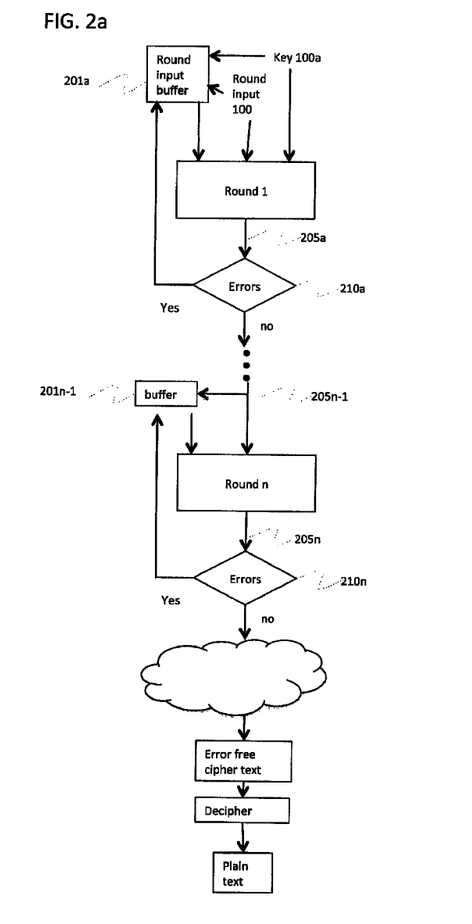
FIG. 2a is a simplified diagram showing correction of a cipher after each round prior to transmission to a receiving end.

FIG. 2*a* shows a simplified block diagram of another embodiment in which error checking 201*a* . . . 210*n* is performed immediately after each round. If a round introduced an error, that round is repeated using the information stored in temporary buffers 210*a* . . . 201*n*. Alternatively, error checking 210*a* . . . 210*n* is performed immediately after each round. Accordingly, if errors were detected, a cipher process can be terminated and re-started before reaching its conclusion (i.e., before producing ciphertext).

Figure 3:
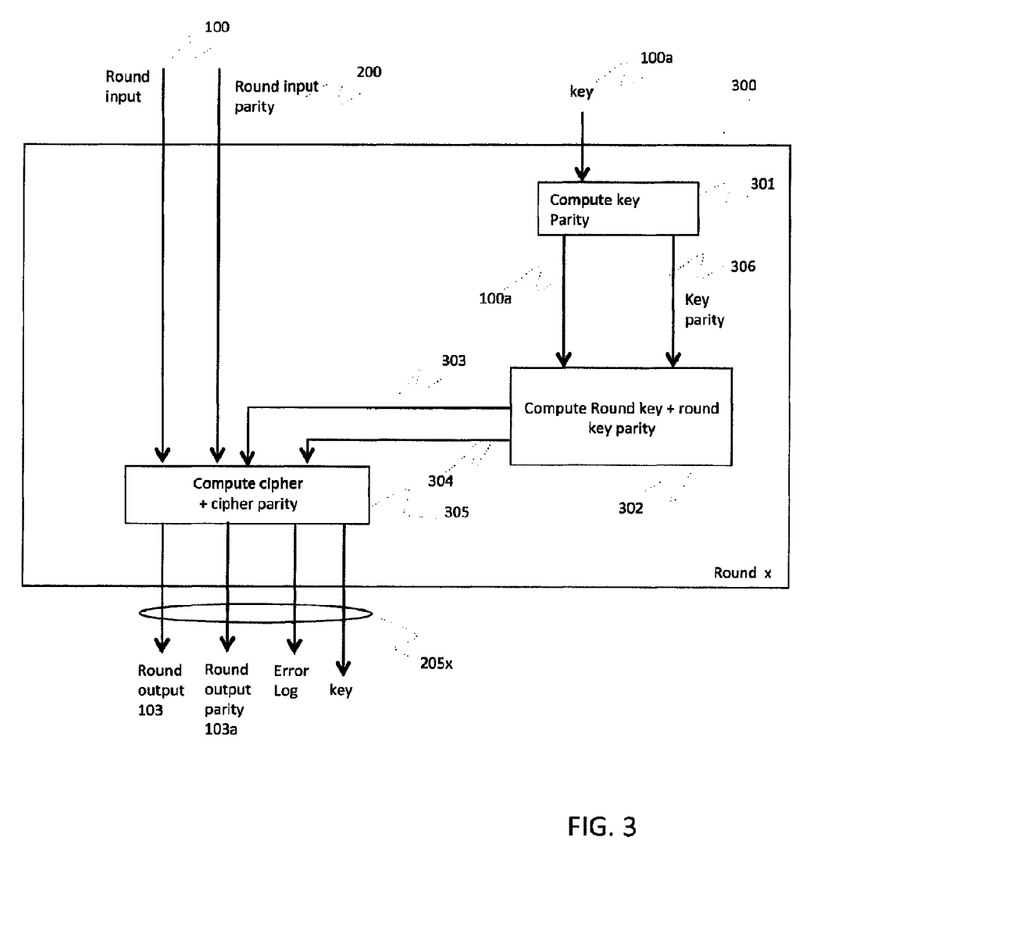
FIG. 3 is a simplified diagram showing addition of parities to a standard cipher process in order to detect errors and generate an error log.

FIG. 3 shows a high level block diagram of an embodiment of a round. A key 100*a* in the form of the secret key for a first round or a round key for other rounds is used to compute 301 the key parity 306. The key 100*a* and key parity are used to compute 302 the round key 303 and round key parity 304 as described below. The round input value 100, round input parity 200, along with the round key 303 and round key parity 304 are used to compute 305 the round output value and round output parity for the round as described below. An error log 205*x* is provided to indicate if an error was detected. Optionally, the log documents errors and their associated round. Alternatively, the log merely indicates that an error has occurred. For example, in its simplest form, the error log is a flag value indicating a presence or absence of an error within the cipher processing.

Figure 4:
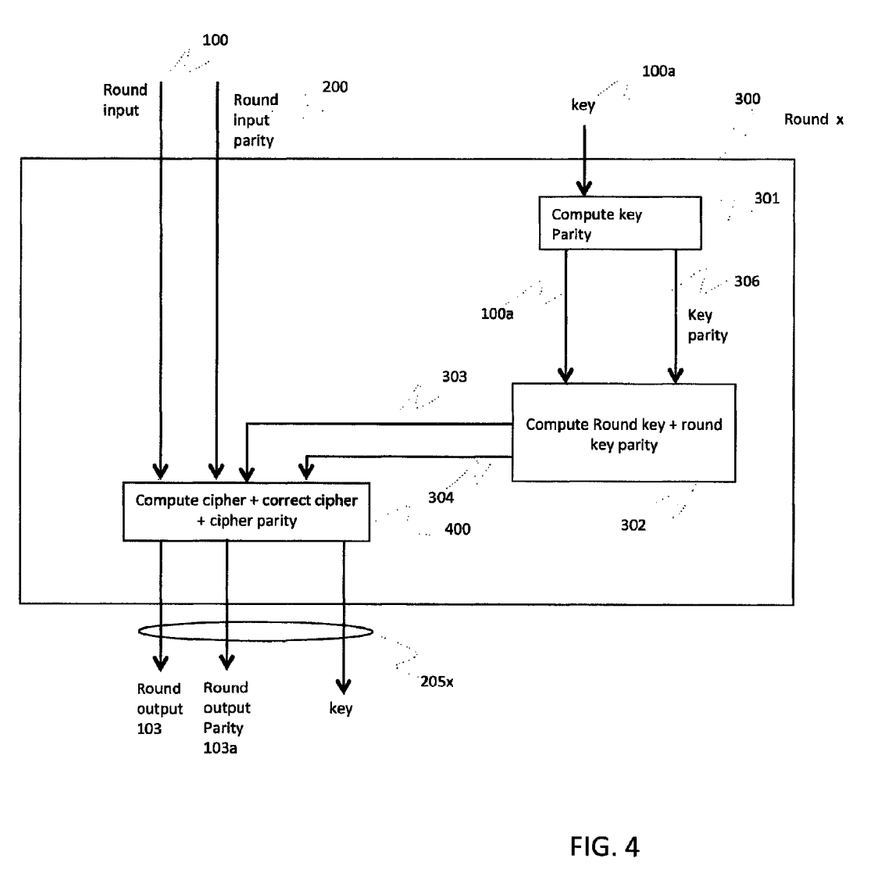
FIG. 4 is a simplified diagram showing how a cipher is corrected when an error is detected with sufficient coding to allow for error correction.

FIG. 4 is a simplified block diagram of a process similar to the process of FIG. 3 wherein error correction techniques are applied 400 to ciphertext when errors are detected in an attempt to make the ciphered data error free. Error correction techniques are well known and are often associated with error detection techniques. Codes are often evaluated based on their error detecting and correcting ability, where more powerful codes detect and allow for correction of a greater number of corrupt bits. When error detection/correction techniques are applied, the resulting process often obviates some or all repetition of cipher rounds.

The general idea for achieving error detection and correction is to add some redundancy, some extra data, to a message, which receivers can use to check consistency of the delivered message and to recover data determined to be corrupted. Error-detection and correction schemes can be either systematic or non-systematic: In a systematic scheme, the transmitter sends the original data, and attaches a fixed number of check bits or parity, which are derived from the data bits by some deterministic process. In a system that uses a non-systematic code, the original message is transformed into an encoded message that has at least as many bits as the original message.

An error-detection and correction process may be combined with a system for retransmissions of erroneous data. To form a hybrid automatic repeat request (HARQ) system, which is a combination of ARQ and forward error-correction coding. Thus, error correction coding is usable to detect and correct many common errors, but when errors exceed the ability of the system, processing of the data is repeated. This allows a forward error correction code that consumes limited processing while supporting error free operation. A balance between performance of the circuit in the absence of errors and performance of the circuit in the presence of errors is typically part of the design process.

Figure 5:
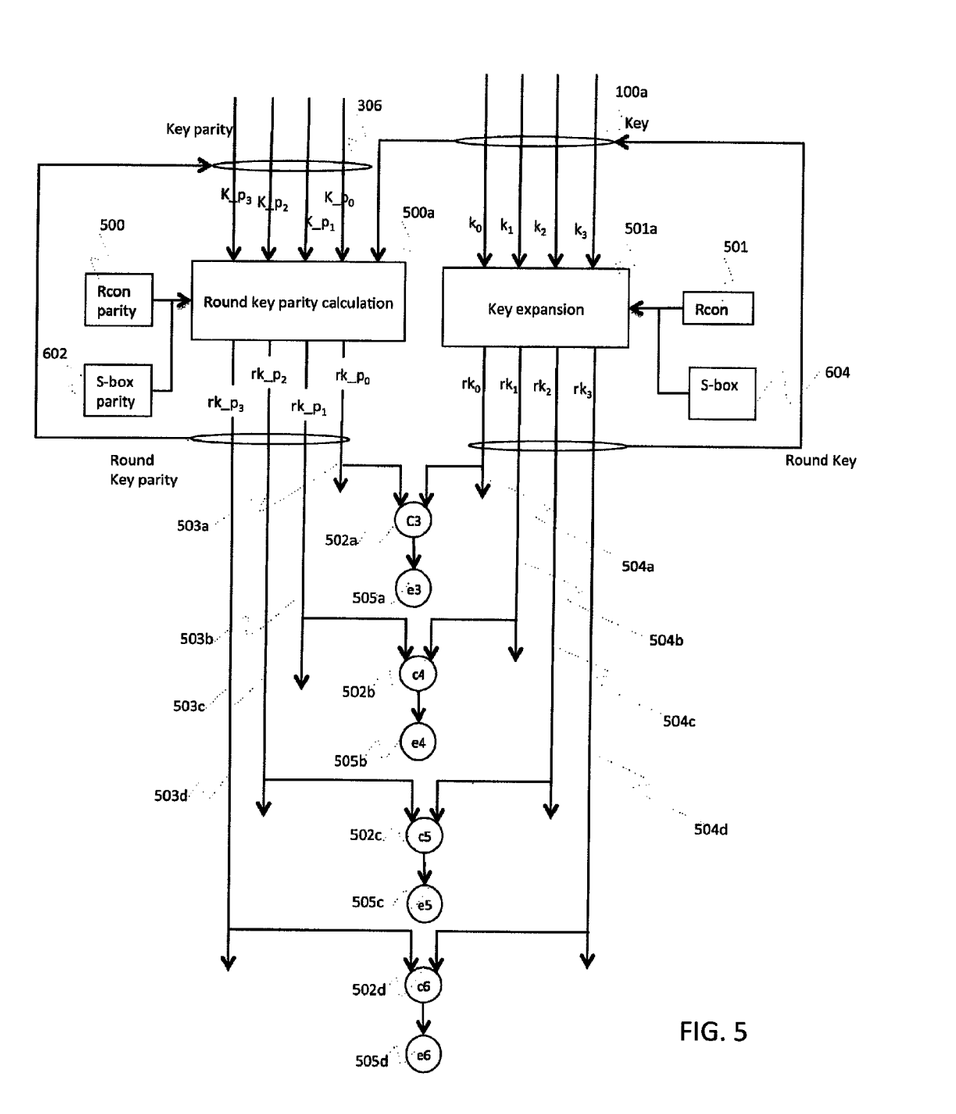
FIG. 5 is a simplified diagram showing addition of parities to a standard key expansion process in order to detect errors.

FIG. 5 shows a simplified block diagram for a process forming an embodiment. Here, the process relies upon a key, for example 128-bit key, for detecting errors during a key expansion sub-module. Shown, one parity symbol is computed for each 32-bit block of key 306 and at an intermediate step 500*a*, a round key parity 503*a* . . . 503*d* is computed. The round key parity 503*a* . . . 503*d* is then checked 502*a* . . . 502*d* against parity for a computed round key 504*a* . . . 504*d* to detect errors 505*a* . . . 505*d*. For example, the parity for the round key is calculated using a lookup table 500 which provides a parity for standard Round Constant values (Reon) 501 as follows:

| Reon value | Reon parity |
|---|---|
| 01 | 1 |
| 02 | 1 |
| 04 | 1 |
| 08 | 1 |
| 10 | 1 |
| 20 | 1 |
| 40 | 1 |
| 80 | 1 |
| 1C | 0 |
| 36 | 0 |

To calculate the round key parity 500*a*, $rk\_p_1 = \text{S-box parity} \oplus \text{Reon parity} \oplus k_1$ $rk\_p_2 = \text{S-box parity} \oplus \text{Reon parity} \oplus k_2$ $rk\_p_3 = \text{S-box parity} \oplus \text{Reon parity} \oplus k_3$ $rk\_p_4 = \text{S-box parity} \oplus \text{Reon parity} \oplus k_4$ The key expansion function 501*a* is done as indicated in NIST, *FIPS*197—*Advanced encryption* standard, November 2001. Then the round key and its associated parity are verified for errors 502*a* . . . 502*d* and when there is a mismatch with the parity, an error 505*a* . . . 505*d* is logged.

Figure 6:
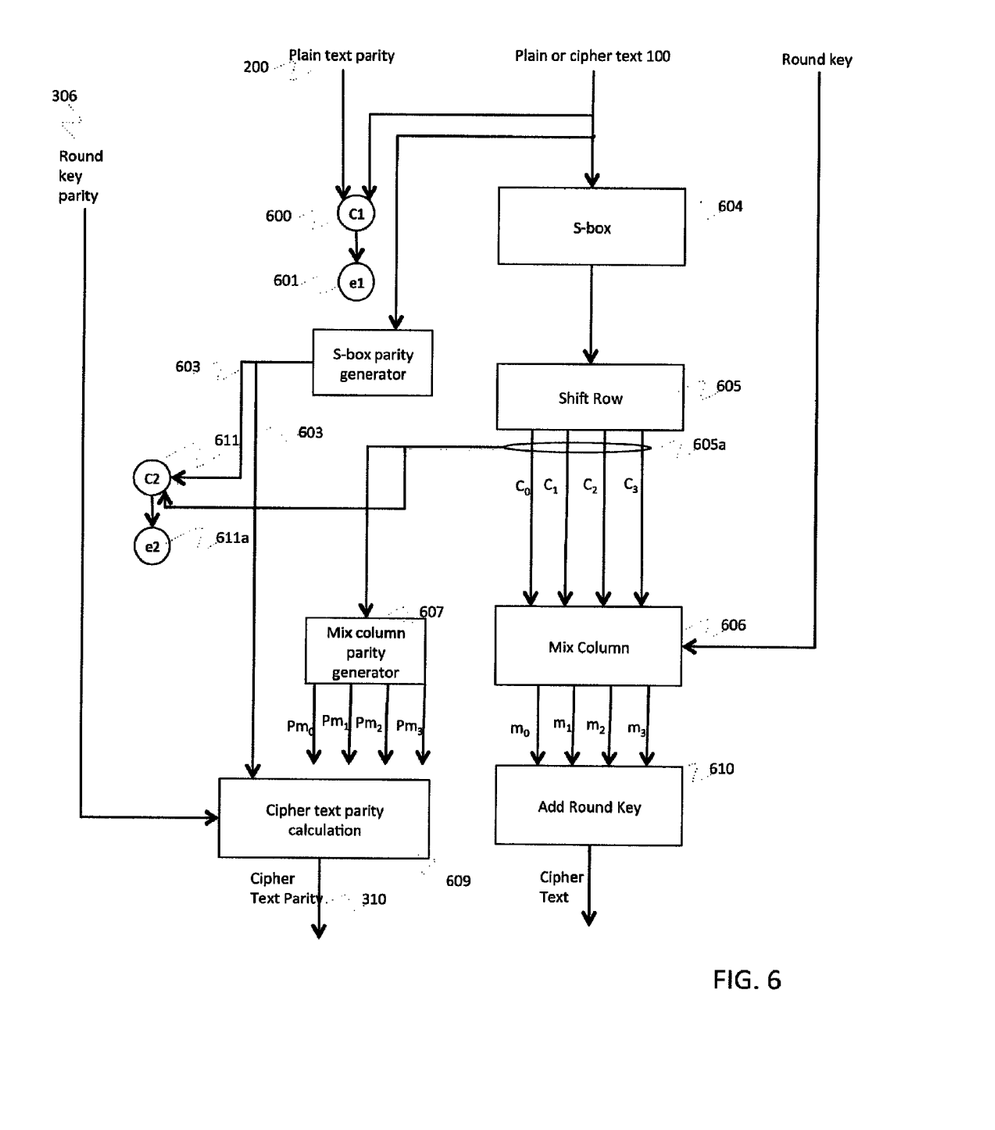
FIG. 6 is a simplified diagram showing addition of parities to a standard encryption process in order to detect errors occurring during said process.

FIG. 6 shows a process for detecting errors at different ciphering sub-modules. The round input value 100 and round input parity 200 are verified at an outset of a round 600 and an error 601 is generated when an error is detected in the round input value. Of course, verifying round input data and parity values is also possible at an end of a round.

The plain text is processed with standard S-box function 604 as described in NIST, *FIPS*197—*Advanced encryption* standard, November 2001. An S-box parity look up table 602 is pre-computed based a non-linear substitution table (S-box) (refer to FIG. 7 of NIST, *FIPS*197—*Advanced encryption* standard, November 2001). An example table is as follows:

| Subbyte | S-box Parity |
|---------|--------------|
| 9C      | 0            |
| Cb      | 1            |

At another intermediate step S-box parity 603 is XOR 611 with the output value 605*a* of standard shift-row operation 605 to detect an error 611*a*.

A parity is also computed at another sub-module as part of the mix-column transformation. The calculation related to parity includes two stages for parity generation, a mix-column operation and an inverse mix-column operation. Mix-column operation 606 (see equation 5.6 of NIST, *FIPS*197*Advanced encryption* standard, November 2001) is written as:

$$\begin{bmatrix} m_0 \\ m_1 \\ m_2 \\ m_3 \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} C_0 \\ C_1 \\ C_2 \\ C_3 \end{bmatrix}$$

The mix-column parity generator is used to calculate parities 607 of $m_0$, $m_1$, $m_2$, $m_3$. Consider the bit representation of byte $C=c_7$, $c_6$, $c_5$, $c_4$, $c_3$, $c_2$, $c_1$, $c_0$. Assuming $P_{C0}$, $P_{C1}$, $P_{C2}$, $P_{C3}$, are parities of bytes $C_0$, $C_1$, $C_2$, $C_3$ and the parity of C is $P_c$, then $$C=c_6c_5c_4[c_3\oplus c_7][c_2\oplus c_7]c_1[c_0\oplus c_7]c_7$$

The parity of $[02]C=[P_c\oplus c_7]$

Now $[03]C=[02]C\oplus C=[c_6\oplus c_7][c_6\oplus c_5][c_5\oplus c_4]$
$[c_4\oplus c_3\oplus c_7][c_3\oplus c_2\oplus c_7][c_1\oplus c_2][c_1\oplus c_0\oplus c_7]$
$[c_0\oplus c_7]$ (1)

The parity of $[03]C=$(parity of $[02]C$)
$\oplus P_C=P_C\oplus c_7\oplus P_C=c_7$ The parity of 607 of $m_0$, $m_1$, $m_2$, $m_3$, is computed as follows:

$$P_{m0}=P_{c0}\oplus P_{c2}\oplus P_{c3}\oplus MSb_{c0}\oplus Msbc1$$

$$P_{m1}=P_{ea}\oplus P_{c}\oplus P_{c3}|MSb_{c1}\oplus MSb_{c2}$$

$$P_{m2}=P_{ea}\oplus P_{c}\oplus P_{c2}\oplus MSb_{c2}\oplus MSb_{c3}$$

$$P_{m3}=P_{ei}\oplus P_{c2}\oplus P_{c3}\oplus MSb_{c3}\oplus MSb_{c0}$$

Where $MSb_{cx}$ represents the most significant bit.

Then $P_{m0}$, $P_{m1}$, $P_{m2}$, $P_{m3}$, 608 are used to generate at 609 the round output parity 310 by performing a bytewise XOR function between the round key parity 306 and each $P_{m0}$, $P_{m1}$, $P_{m2}$, $P_{m3}$. The round output value is computed as per the standard procedure 610 set out in NIST, *PIPS* 197—*Advanced encryption standard*, November 2001.

Figure 7:
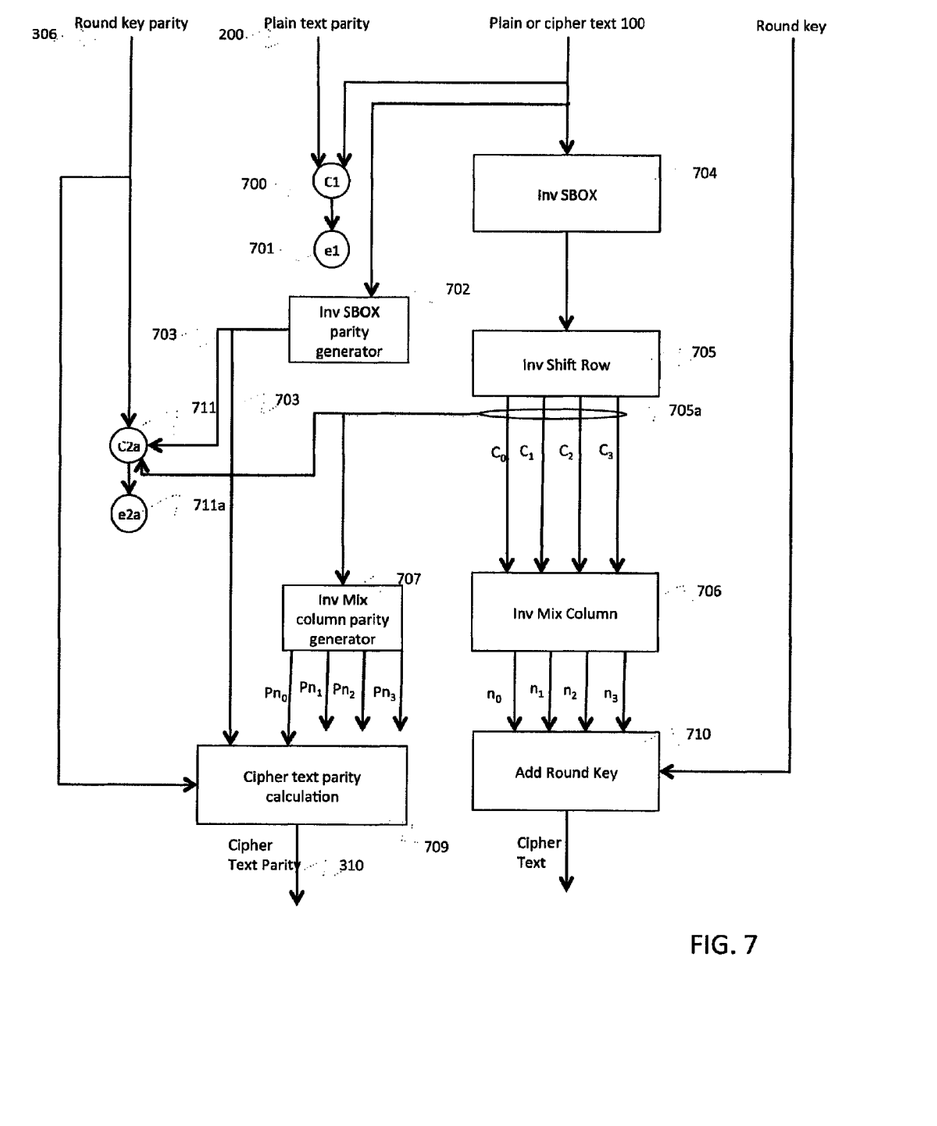
FIG. 7 is a simplified diagram showing addition of parities to a standard decryption process in order to detect errors occurring during said process.

FIG. 7 is a simplified flow diagram showing a decryption process. The parity computation is similar to that of FIG. 6, except for the mix column parity generator. For the decryption process, $$\begin{bmatrix} n_0 \\ n_1 \\ n_2 \\ n_3 \end{bmatrix} = \begin{bmatrix} 0E & 0B & 0D & 09 \\ 09 & 0E & 0B & 0D \\ 0D & 09 & 0E & 0B \\ 0B & 0D & 09 & 0E \end{bmatrix} \begin{bmatrix} C_0 \\ C_1 \\ C_2 \\ C_3 \end{bmatrix} = \begin{bmatrix} 02 & 03 & 01 & 01 \\ 01 & 02 & 03 & 01 \\ 01 & 01 & 02 & 03 \\ 03 & 01 & 01 & 02 \end{bmatrix} \begin{bmatrix} C_0 \\ C_1 \\ C_2 \\ C_3 \end{bmatrix} \oplus \quad (3)$$

$$\begin{bmatrix} 0C & 08 & 0C & 08 \\ 08 & 0C & 08 & 0C \\ 0C & 08 & 0C & 08 \\ 08 & 0C & 08 & 0C \end{bmatrix} \begin{bmatrix} C_0 \\ C_1 \\ C_2 \\ C_3 \end{bmatrix}$$

The parity of $[04]C=P_c\oplus c_7\oplus c_6$

The parity of $[08]C=P_c\oplus c_7\oplus c_6\oplus c_5$

And the parity of $[0C]C=$(parity of $[04]C$)$\oplus$(parity of $[08]C$) Let:

$$\begin{bmatrix} q_0 \\ q_1 \\ q_2 \\ q_3 \end{bmatrix} = \begin{bmatrix} 0C & 08 & 0C & 08 \\ 08 & 0C & 08 & 0C \\ 0C & 08 & 0C & 08 \\ 08 & 0C & 08 & 0C \end{bmatrix} \begin{bmatrix} C_0 \\ C_1 \\ C_2 \\ C_3 \end{bmatrix}$$

Then equation (3) can be rewritten as:

$$\begin{bmatrix} n_0 \\ n_1 \\ n_2 \\ n_3 \end{bmatrix} = \begin{bmatrix} m_0 \\ m_1 \\ m_2 \\ m_3 \end{bmatrix} \oplus \begin{bmatrix} q_0 \\ q_1 \\ q_2 \\ q_3 \end{bmatrix}$$

Then:

$P_S=$parity of $[08]C_0\oplus$parity of $[08]C_2$ $P_T=$parity of $[08]C_1\oplus$parity of $[08]C_3$ $P_U=$parity of $[0C]C_0\oplus$parity of $[0C]C_2$ $P_V=$parity of $[0C]C_1\oplus$parity of $[0C]C_3$ $P_s=P_{c0}\oplus P_{c2}\oplus C_{07}\oplus C_{06}\oplus C_{27}\oplus C_{26}\oplus P_U$ $P_T=P_{c1}\oplus P_{c3}\oplus C_{17}\oplus C_{16}\oplus C_{31}\oplus C_{36}\oplus P_V$ $P_U=C_{05}\oplus C_{25}$ $P_V=C_{15}\oplus C_{35}$ and $P_{q0}=P_S\oplus P_V$ $P_{q1}=P_r\oplus P_u$ $P_{q2}=P_s\oplus P_V$ $P_{q3}=P_r\oplus P_U$ then $P_{n0}=P_{m0}\oplus P_{q0}$ $P_{n1}=P_{m1}\oplus P_{q1}$ $P_{n2}=P_{m2}\oplus P_{q2}$ $P_{n3}=P_{m3}\oplus P_{q3}$ Thus for decryption, the inv S-box parity 703 is XOR 711 and the round key parity and with output value 705a of a standard inv shift-row operation 705 to detect an error 711a.

Figure 8A:
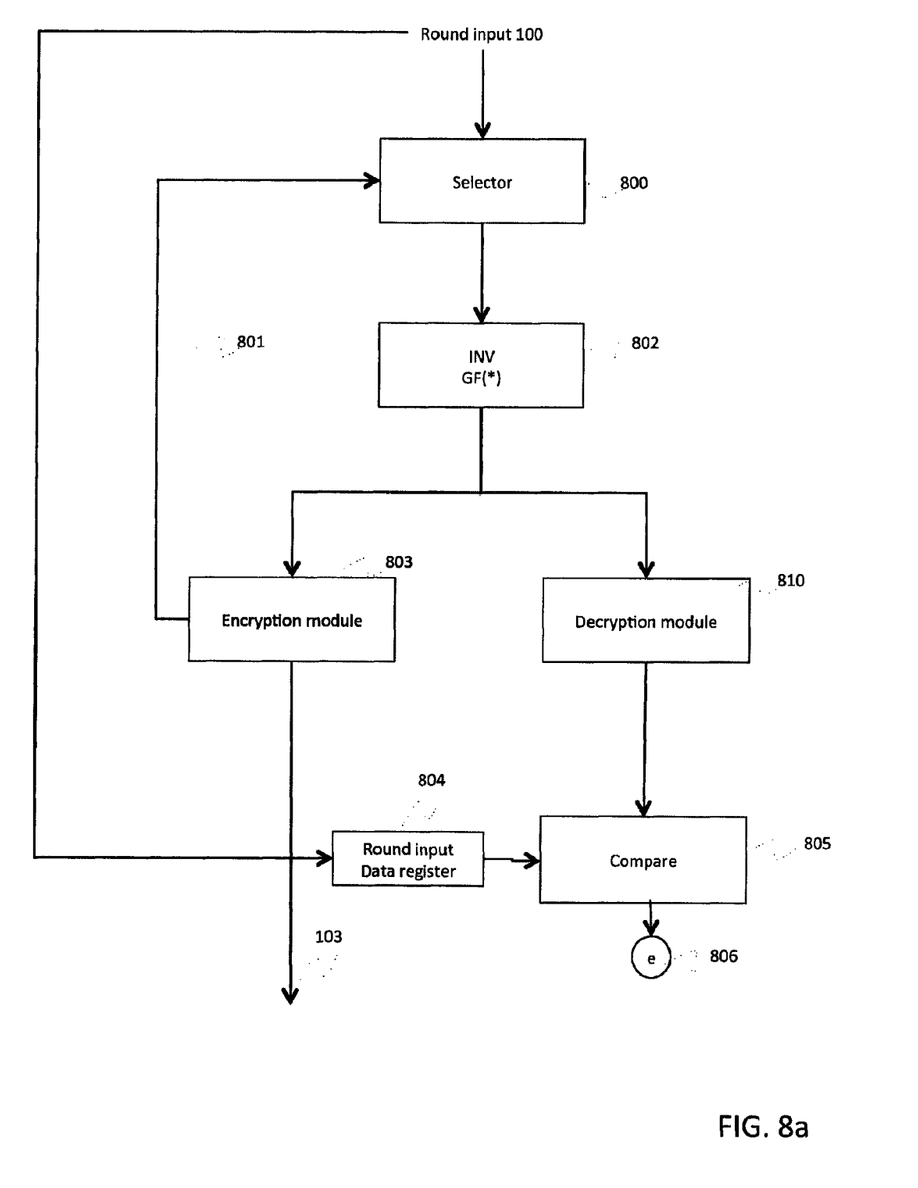
FIG. 8a is a simplified diagram showing an embodiment supporting multiplicative fault detection.

FIG. 8a shows a simplified block diagram of another embodiment for multiplicative fault detection. The process is applicable to a plurality of key sizes and to detecting many types of error in the ciphering process and key scheduling. The process relies on a common inverse function of $GF(2^8)$ 802 and uses the decryption path for error detection while encryption is in operation and the encryption path for error detection while decryption is in operation. Round input value n−1 100 is stored in a data register 804. After round input value n−1 is encrypted or partially encrypted by encryption module 803, round output value n−1 801 is fed to a selector 800. The selector transmits the round output value n−1 801 to the decryption module 810. The output value from the decryption module 810 is compared 805 to the round input value n−1 stored in the data register 804. When the two values are indicative of an error in the cipher process, as error is logged at 806. For example, when the output value from the decryption module 810 and the round input value n−1 stored in the data register 804 are other than identical an error is logged at 806. In the next cycle, the selector takes the round input value n for transmission to the encryption module 803 and then proceeds to alternate between encryption of the round input value and decryption of the round output value to allow for comparison to enable error detection in the encryption process.

Though the process shown relates to a round, it is evident that so long as the process portion is reversible, error detection is performable on any subset of operations within an encryption process by relying on a method such as that of FIG. 8.

Figure 9:
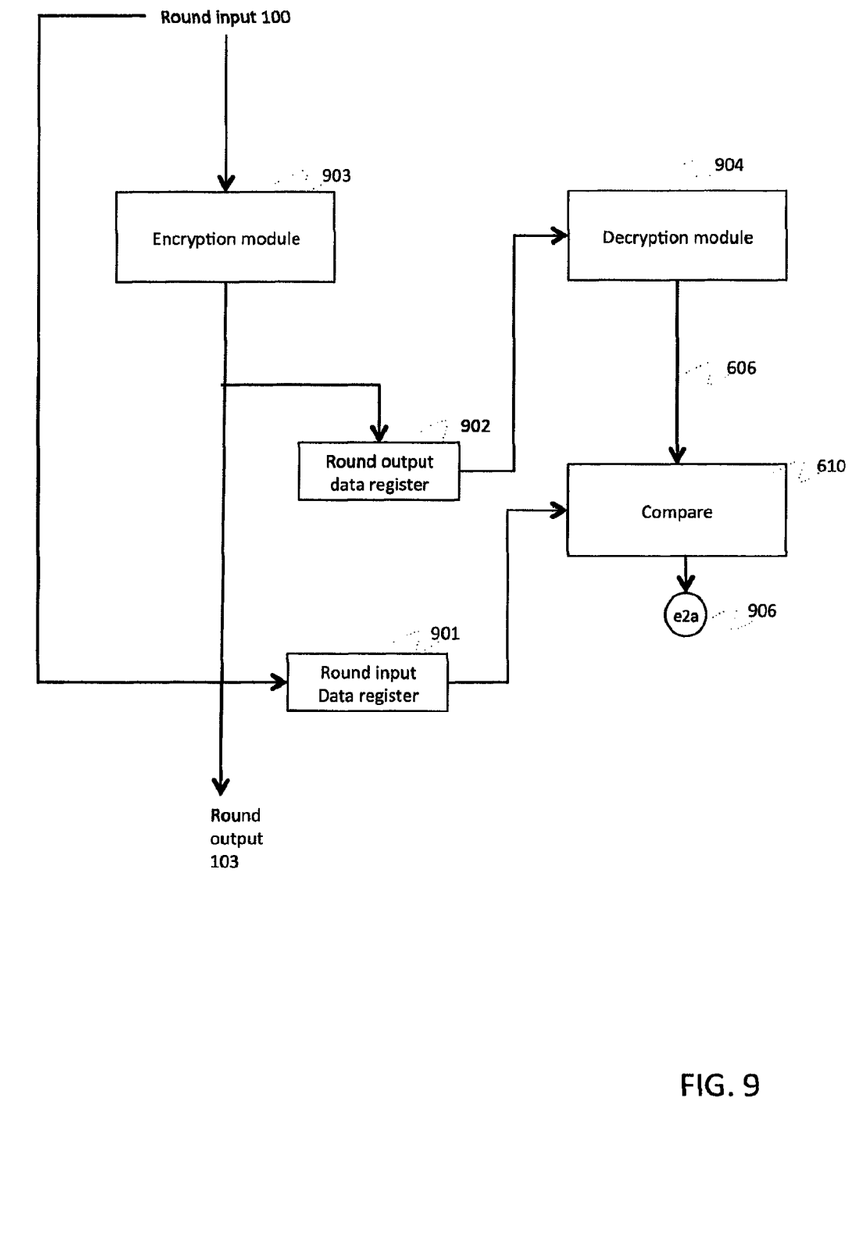
FIG. 9 is a simplified diagram showing an embodiment for fault detection in high-speed applications.

FIG. 9 shows a simplified block diagram of another embodiment for fault detection in high speed applications. The process is applicable to a plurality of key sizes and detection of many types of errors in the ciphering process and key scheduling. The process relies on the decryption path for error detection while encryption is in operation and the encryption path for error detection while decryption is in operation. Round input value n−1 100 is stored in a data register 901, and after round input value n−1 is encrypted or partially encrypted by encryption module 903, round output value n−1 103 is stored in a data register 902, which is decrypted by the decryption module 904. The output value from the decryption module 606 is compared to the round input value n−1 stored in the data register 901, when the two values indicate an error in ciphering, for example the two values are other than identical, an error is logged at 906.

Though the process shown relates to a round, it is evident that so long as the process portion is reversible, error detection is performable on any subset of operations within an encryption process by relying on a method such as that of FIG. 9.

Although the processes described above including those with reference to the foregoing block diagrams have been described separately, two or more of the processes disclosed herein can be combined to form a combined process. The processes described herein are implementable by storing operations and/or descriptions in machine readable form for, when executed, resulting in such a process.

Furthermore, the processes described herein are implementable in software or in hardware. In hardware implementations, the processes are embodied within an apparatus supporting the processes described herein. Still further, the processes described herein are implementable by storing operations and/or descriptions in machine readable form for, when executed, resulting in such an apparatus. Any of the methods, processes, implementations, or procedures described herein optionally include machine-readable instructions for execution by: (a) a processor, (b) a controller, and/or (c) any other suitable processing device. Any process, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart or block diagram depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of some blocks may be changed, and/or some of the blocks described may be changed, eliminated, or combined.

It should be noted that the processes illustrated and discussed herein have various modules for performing particular functions and for interacting with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination. Further, optimization of some processes may result in blocks being combined or functions being rearranged across different blocks or in a different architecture.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method comprising:
    receiving first data to be ciphered;
    ciphering the first data using a cipher process comprising a plurality of cipher rounds;
    calculating at least one parity symbol for at least one of the cipher rounds, including calculating an initial parity symbol form the initial round input value, based on at least one of the calculated parity symbols, determining that an output value of at least one cipher round for which the at least one parity symbol was calculated has an error;
    repeating at least one of the cipher rounds until it is determined that there are no error within any of the output values of the at least one cipher round for which at least one parity symbol was calculated;

determining an initial round input value from the first data;

storing the initial round input value in temporary storage; and storing the initial parity value in temporary storage.

2. A method of claim 1, comprising:

repeating each of the plurality of cipher rounds if it is determined that there is an error within at least one of the output values.

3. The method of claim 2, further comprising receiving the stored initial round input value from the temporary storage prior to repeating each of the plurality of cipher rounds.

4. The method of claim 1, further comprising:

storing in a round input buffer a round input value for each of the plurality of rounds to be repeated;

receiving from the round input buffer data stored within the round input buffer prior to repeating each of the plurality of round to be repeated.

5. A cryptographic system comprising:

a cipher processor configured to execute a cipher process comprising an initial cipher round and a plurality of subsequent cipher rounds, each cipher round receiving a round input value and outputting a round output value;

a cipher error block configured to calculate an initial error detection symbol for the initial round output value from the initial cipher round and additional error detection symbols for round output values of at least one of a plurality of subsequent cipher rounds; and a storage device for storing initial round input values and error detection symbols;

wherein the cipher processor is further configured to determine that a round output value of at least one cipher round has an error based on at least one of the calculated error detection symbols.

6. The Cryptographic system of claim 5, wherein the cipher processor is further configured to receive initial round input values from the storage device and to repeat the cipher process upon determining that a round output value of at least one cipher round has an error.

7. The cryptographic system of claim 5, wherein the storage device is further configured to store the round input value of each cipher round and the cipher processor is further configured to receive from the storage device the round input value and repeat any cipher round for which the cipher processor determines that there is an error in the round output value.

* * * * *